Aug. 18, 1959 — R. L. ZABEL — 2,900,084

OUTLET TRAP FOR SEPTIC TANKS

Filed July 18, 1956

INVENTOR.
ROBERT L. ZABEL

BY *Arthur H. Robert*

ATTORNEY

2,900,084
OUTLET TRAP FOR SEPTIC TANKS

Robert L. Zabel, Fern Creek, Ky.

Application July 18, 1956, Serial No. 598,611

7 Claims. (Cl. 210—460)

This invention relates to an outlet trap for preventing the discharge of solids with the water at the outlet of a septic tank.

One common type of sewage disposal installation used particularly with residential construction employs a sewage reservoir or septic tank in which the sewage is collected to permit the solids contained therein to be digested by the action of anaerobic bacteria. When the sewage water reaches a predetermined level in the tank, it flows through an outlet into excavations in the surrounding terrain, such as drainage fields, leach beds, dry wells and the like where it is absorbed. Unfortunately, as the water flows from the tank, it tends to carry with it undigested and semi-digested solids which enter the drainage field, etc., and inhibit or even prevent the percolation or absorption of liquid into the surrounding soil. This is a constant source of difficulty accounting for the major portion of all septic tank installation failures.

The principal objects of the present invention are: to provide a new and novel outlet trap for a septic tank which effectively blocks the passage of solids while permitting the rapid passage of a large volume of clear water; to provide an outlet trap, which is compactly constructed so that it occupies little space and yet is of very large water flow capacity; to provide an outlet trap which increases the digestion activity within the tank; to provide a new and improved outlet trap of simple and inexpensive construction which is easily installed in a septic tank and which requires only a minimum of maintenance.

The principal objects of my invention are achieved by an outlet trap comprising a horizontally elongate overflow dam and an overlying canopy positioned above the dam and cooperating with it to form a horizontally elongate, vertically narrow slot of substantial length. The canopy is of such shape that it overhangs the upper edge of the dam on its upstream side. With this arrangement, the slot can be made extremely narrow and still provide an outlet opening of substantial water passing capacity even when clogged by solids over a considerable portion of its length. Furthermore, by having the canopy project upstream from the overflow edge of the dam, the clogging solids will, for the most part, be held at the mouth of the slot in such a position that they will settle back into the tank when digested rather than pass through the slot.

This invention is illustrated in the accompanying drawing wherein.

Figure 1:
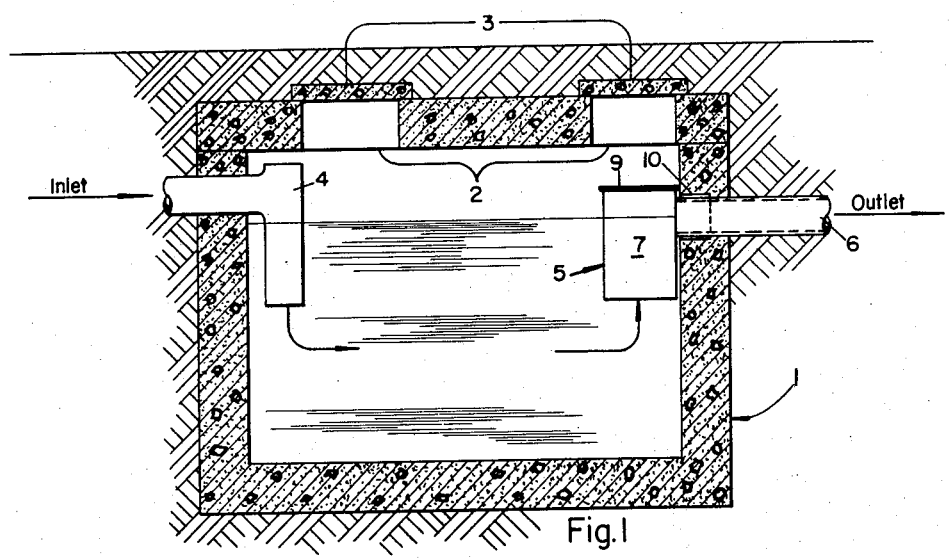
Fig. 1 is a sectional view of a septic tank having an outlet trap made in accordance with my invention.
Figure 2:
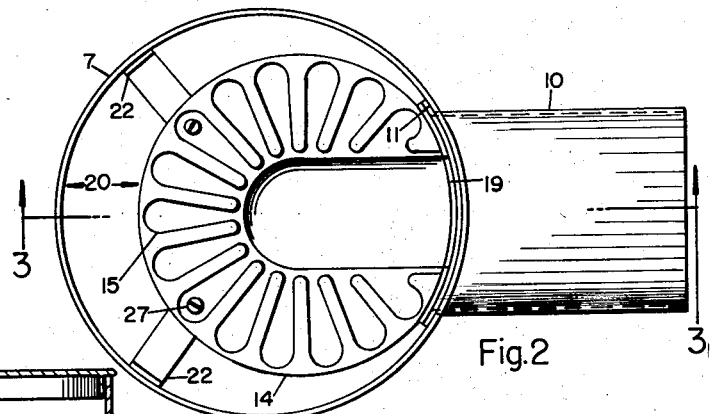
Fig. 2 is a top plan view of the outlet trap of Fig. 1 with the cover plate removed.

Fig. 1 shows a rectangular septic tank 1 of conventional concrete construction which preferably is buried a short distance below the surface of the ground. The top of the tank contains a pair of access openings 2, normally closed by a pair of removable cover plates 3. The sewage enters at one side of this tank through a conventional T-shaped fitting 4 and the clear water is discharged at the other side through an outlet trap 5 made in accordance with my invention. The discharge from trap 5 enters the tank outlet pipe 6 through which it is conducted to a drainage field or the like in the surrounding soil.

The illustrated embodiment of my outlet trap 5 comprises: a tubular housing; an overflow dam; and a canopy mounted on the dam. The tubular housing 7 is preferably cylindrical in shape having a bottom inlet 8 and a top opening normally closed by a cover 9. To withstand corrosion and chemical activity, the housing 7 and the other parts of this device may be and preferably are composed of a corrosion resistant material such as stainless steel or glass where suitable. The upper outlet portion of the housing 7 is provided with a short horizontally-extending cylindrical sleeve 10, the inner end of which is radially flanged at 11 and secured to the housing 7.

The overflow dam comprises: a base, forming the floor of the dam; and an overflow wall.

The base 14 may be composed of any suitable material. Preferably it is formed of concrete poured into a suitable mold providing it with the desired floor-forming contour.

The overflow wall may likewise be composed of any suitable material. Preferably it is in the form of an elongated strip 15, which is bent to form a plurality of upstanding accordion-like folds extending sinuously back and forth across an elongate path to provide a sinuous overflow edge. For the sake of compactness, this path is circular with the ends of the strip 15 spaced from each other to form an opening communicating with the sleeve 10. However, it should be understood that the strtip 15 may be arranged in any appropriate form to provide an elongate path of substantial length. The sinuous overflow strip 15 is preferably rigidly held in its circular path by anchoring its lower end in the fresh concrete of the base and holding it therein until the base sets. Preferably, also, the strip is relatively thin so that the overflow edge it provides does not afford a substantial horizontal surface on which solids can accumulate.

Zabel septic tank trap

The canopy is in the form of a disc or plate 16 composed preferably of glass or of any other suitable material. It is supported on the overflow edge of the dam 15 and spaced therefrom by means of inverted U-shaped spacers 17. As the path of the strip 15 is circular, the plate is therefore circular and cooperates with the dam overflow edge to form a horizontally elongate slot 18 of considerable length. The diameter of the plate 16 preferably is such as to cause the plate to overhang the upper edge of the dam, on the upstream side, throughout its length or, at least, over a substantial portion thereof, as shown in Fig. 3.

Figure 3:
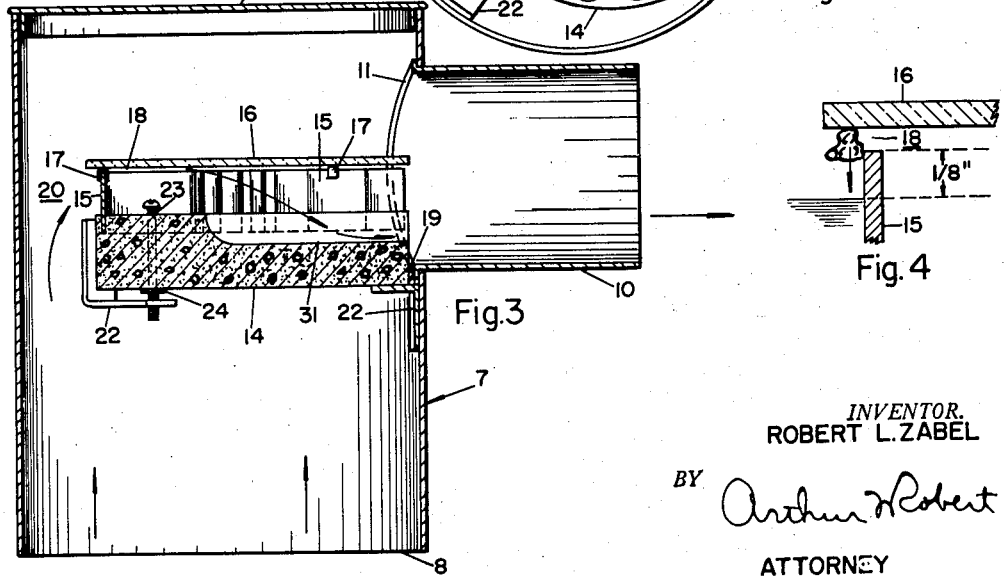
Fig. 3 is a sectional view taken along line 3—3 of Fig. 2.
Figure 4:
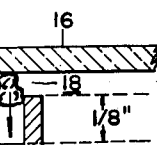
Fig. 4 is an enlarged fragmentary view showing the relationship of the dam and canopy.

The overflow dam is positioned within the tubular housing 7 as shown in Fig. 3, with a peripheral portion of the base 14 abutting the inner wall of the housing 7 such that the opening defined by the spaced ends of the strip 15 is centrally arranged with respect to the housing sleeve 10. A gasket 19, or a suitable plastic sealing compound, is preferably used to insure a water tight connection between the base 14 and housing 7. The remaining peripheral portions of the overflow dam form a crescent-shaped chamber 20 with the inner wall of the housing 7.

The overflow dam is mounted on spaced angle brackets 22 which are suitably secured to the wall of the housing 7. As it is necessary to level the overflow dam, leveling means are provided in the form of a pair of threaded bolts 23 which extend through vertical bores within the base 14 and threadedly engage each of the brackets 22 within the crescent-shaped chamber 20. A fixed washer 24 on these bolts 23 supports the lower edge of the base 14 and the bolts may be rotated for dam leveling purposes.

In the operation of my outlet trap, sewage enters the tank 1 through the inlet pipe 4. Due to the activity of the anaerobic bacteria, the solid matter begins to disintegrate under a digesting action and ultimately falls to the bottom of the tank 1 in the form of ash.

The normal water level in the tank 1 is slightly below slot 18 and the baffle provided by the relatively lower portion of tank 7 tends to prevent the flow of any solids into the housing 7 through the inlet 8. Nevertheless, some solids will pass into housing 7 and ultimately flow to the elongate slot 18. This slot 18 is so vertically narrow that it normally is effective to strain out most of the solids reaching it.

One of the outstanding features of my invention is that, although substantial portions of the slot 18 may thus become clogged by solids, the slot is of such length, and consequently of such total area, that substantial portions of it remain open. Now, after the lapse of a relatively short period, the clogged portions of the slot will reopen due to the digestion of the clogging solids.

Furthermore, I reduce the passage of any type of solid matter through the slot 18 to insignificant proportions by the extension of the canopy 16 outwardly from the dam overflow edge into the crescent-shaped passageway 20. With this overhanging portion, most of the clogging solids do not enter the slot 18 completely. On the contrary, such solids are held by the vertical wall of the strip 15 and the horizontal wall of the canopy in a position such that, if freed, they will fall downwardly to the bottom of the tank. For example, when digestion is complete, the resultant ash apparently falls through the chamber 20 and settles to the bottom of the tank. Thus both digested as well as undigested or semi-digested solids are prevented from leaving the tank 1.

Another of the outstanding features of this invention resides in the use of a capillary action. After the water in the trap 5 has dropped to a level coincident with the upper edge of the dam overflow, clear water nevertheless continues to flow through the slot 18, until the water level on the upstream side of the dam drops to a lower level which lies approximately 1/8th of an inch below the dam overflow edge. It cannot be said with certainty what causes this continued flow but it appears to be the result of capillary action and this action continues so long as water touches the plate 16 and thus bridges the slot 18. With a slot of 1/16th of an inch, I have found that the level within the tank will drop to a level 1/8th of an inch below the overflow edge before the flow ceases.

As a result of this additional 1/8th inch drop in the water level by the capillary action, any heavy surge of sewage into the tank 1 must increase the water level in the entire tank over 1/8th of an inch before any discharge begins to flow through slot 18.

While my foregoing construction minimizes the possibility of the normal outlet becoming completely clogged, unusual conditions of operation may nevertheless cause or produce such an occurrence. Heretofore when an outlet became completely clogged, the septic system could do no more than back up. In accordance with the present invention, however, I provide an emergency escape for the contents of the housing 17 by placing the space above plate 16 in communication with the outlet sleeve 10. With this arrangement, should the slot 18 become completely clogged, the contents of the tank will escape through outlet 10 when the level rises high enough to submerge plate 16. Again, however, the plate 16 may be increased in thickness or itself provided with a dam of predetermined height over a selected range in order to prevent any overflow until the level within the tank reaches a level which may be selected at different values under different installation conditions. While this arrangement permits the escape of some solids into the outlet distribution sysem, it prevents the back-up of the system which, I believe, is the more objectionable condition of the two.

It can be seen that with my novel outlet trap, the discharge of solids from the septic tank outlet into the clear water distribution system has been virtually eliminated. Furthermore, by retaining more solids, my system has the benefit of increased bacterial activity.

While I have shown a sinuous dam, other shapes may be employed ranging from a straight horizontal overflow edge to one of spiral shape. By using an elongate slot of relatively great length, the possibility of clogging is minimized to a degree where it is no longer a serious maintenance factor. At the same time, the overhanging canopy not only forms one side of the slot but tends to prevent the escape of solids, semi-digested solids or ash. Finally, the capillary action feature conditions my tank to handle surges in a way normally preventing the escape of solids.

Having described my invention, I claim:

1. An outlet trap for a septic tank comprising: a dam providing a horizontally-elongate upper overflow edge; and means cooperating with that edge to form a horizontally-elongate vertically-narrow outlet slot, said cooperating means being in the form of an overlying canopy positioned to close to said edge and arranged to overhang it on the upstream side.

2. The trap of claim 1 wherein: said canopy comprises a plate spaced from and supported on said overflow edge.

3. The trap of claim 2 wherein: said canopy is spaced from said edge by a plurality of U-shaped members spaced along and inverted over said edge.

4. The trap of claim 1 wherein: said canopy is sufficiently close to said edge to cause water to continue to flow through said outlet slot by capillary action after the level of water on the upstream side of the trap has dropped to said edge.

5. An outlet trap for a septic tank comprising: a dam providing a horizontally-elongate upper overflow edge, said dam including a strip extending sinuously back and forth across an elongate path; and means cooperating with that edge to form a horizontally-elongate vertically-narrow outlet slot.

6. The trap of claim 5 wherein: said dam includes a base on which said sinuous strip is rigidly mounted.

7. The trap of claim 5 wherein: said elongate path is circular.

References Cited in the file of this patent

UNITED STATES PATENTS

| | | |
|---|---|---|
| 65,751 | Jacobs | June 11, 1867 |
| 228,091 | Lowell | May 25, 1880 |
| 977,860 | Franklin | Dec. 6, 1910 |
| 1,111,470 | Krause | Sept. 22, 1914 |
| 1,582,915 | Farley | May 4, 1926 |
| 2,256,626 | Rile | Sept. 23, 1941 |
| 2,356,953 | Snow | Aug. 29, 1944 |